(12) United States Patent
Ahn et al.

(10) Patent No.: US 12,047,019 B2
(45) Date of Patent: Jul. 23, 2024

(54) ENERGY HARVESTING SYSTEM USING MULTIPLE AMBIENT ENERGY SOURCES

(71) Applicant: KOREA ELECTRONICS TECHNOLOGY INSTITUTE, Seongnam-si (KR)

(72) Inventors: Hyunseuk Ahn, Seongnam-si (KR); Younghan Kim, Seoul (KR); Seungok Lim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 690 days.

(21) Appl. No.: 17/213,866

(22) Filed: Mar. 26, 2021

(65) Prior Publication Data

US 2021/0218352 A1 Jul. 15, 2021

Related U.S. Application Data

(63) Continuation of application No. PCT/KR2019/016620, filed on Nov. 28, 2019.

(51) Int. Cl.
 *H02N 2/18* (2006.01)
(52) U.S. Cl.
 CPC ............ *H02N 2/186* (2013.01); *H02N 2/181* (2013.01); *H02N 2/185* (2013.01)
(58) Field of Classification Search
 CPC ......... H02N 11/00; H02N 2/185; H02N 2/181
 See application file for complete search history.

(56) References Cited

U.S. PATENT DOCUMENTS

| 2011/0062912 A1* | 3/2011 | Yang ............... H02J 7/0068 320/132 |
| 2011/0304295 A1 | 12/2011 | McNally |

(Continued)

FOREIGN PATENT DOCUMENTS

| EP | 2913913 A1 | 2/2015 |
| JP | 2006-340482 A1 | 12/2006 |

(Continued)

OTHER PUBLICATIONS

International Search Report, mailed Aug. 28, 2020 in International Application No. PCT/KR2019/016620, in 3 pages.

(Continued)

*Primary Examiner* — J. San Martin
(74) *Attorney, Agent, or Firm* — Knobbe, Martens, Olson & Bear, LLP

(57) ABSTRACT

An energy harvesting system includes a plurality of energy converters connected to multiple ambient energy sources, respectively, receiving energy from the multiple ambient energy sources, and converting the received energy into electrical energy. The system also includes an electrical energy buffer receiving and collecting electrical energy from the energy converters, and combining the collected electrical energy to have a predetermined power level and a constant voltage converter receiving the combined electrical energy from the electrical energy buffer, and converting the received electrical energy into driving power of a power level usable by a load. The system further includes an electrical energy storage receiving the driving power from the constant voltage converter, storing the received driving power, and providing the stored driving power to the load. When internal power is generated in a specific energy converter, the generated internal power is selectively used as external power for another energy converter.

9 Claims, 3 Drawing Sheets

(56) References Cited

U.S. PATENT DOCUMENTS

| | | |
|---|---|---|
| 2015/0171628 A1 | 6/2015 | Ponec et al. |
| 2016/0197481 A1 | 7/2016 | Nishigai |
| 2016/0211742 A1 | 7/2016 | Mohammad et al. |
| 2018/0337551 A1 | 11/2018 | Park et al. |

FOREIGN PATENT DOCUMENTS

| | | |
|---|---|---|
| JP | 2009-225489 A | 10/2009 |
| JP | 2016-208657 A | 12/2016 |
| JP | 2017-060375 A | 3/2017 |
| KR | 10-2011-0027438 A | 3/2011 |
| KR | 10-2017-0057113 A | 5/2017 |
| KR | 10-2017-0101756 A | 9/2017 |
| WO | 2018-220406 A1 | 12/2018 |

OTHER PUBLICATIONS

Extended European Search Report in corresponding Europe Application No. 19946250.8 dated Jan. 4, 2023.
Notice of Allowance dated Jan. 20, 2022 in Korean Application No. 10-2018-0115094.
Office Action dated Jun. 2, 2021 in Korean Application No. 10-2018-0115094, in 4 pages.

\* cited by examiner

ENERGY HARVESTING SYSTEM USING MULTIPLE AMBIENT ENERGY SOURCES

CROSS REFERENCE TO RELATED APPLICATIONS

This is a continuation application of International Patent Application No. PCT/KR2019/016620, filed on Nov. 28, 2019, which is incorporated herein by reference in its entirety.

BACKGROUND

Technical Field

The described technology relates to an energy harvesting system. Particularly, the described technology relates to an energy harvesting system that collects more energy from multiple ambient energy sources and operates an electronic device based on the energy.

Description of Related Technology

As the Internet of Things (IoT) technology spreads in a wide range of fields, it is predicted that the ultra-small/low-power IoT device market will grow explosively. However, such IoT devices have limitations in power supply manners such as battery replacement or power cord connection, which is one of the obstacles to the spread of IoT services.

Energy harvesting technology is attracting attention as the power supply technology for IoT devices. Recently, through the convergence of energy harvesting and IoT technologies, research on power-free driving technology or battery usage time extension technology for IoT devices is being actively conducted, and the demands of related markets are also increasing.

SUMMARY

Accordingly, an object of the described technology is to provide an energy harvesting system capable of collecting more energy in various environments by using multiple ambient energy sources rather than using only one energy source.

Another object of the described technology is to provide an energy harvesting system capable of improving energy collection efficiency by using small amounts of electric energy collected by respective energy converters.

In order to accomplish the above object, the described technology provides an energy harvesting system using multiple ambient energy sources, the energy harvesting system including a plurality of energy converters connected to the multiple ambient energy sources, respectively, receiving energy from the multiple ambient energy sources, and converting the received energy into electrical energy; an electrical energy buffer receiving and collecting electrical energy from the plurality of energy converters, and combining the collected electrical energy to have a predetermined power level; a constant voltage converter receiving the combined electrical energy from the electrical energy buffer, and converting the received electrical energy into driving power of a power level usable by a load; and an electrical energy storage receiving the driving power from the constant voltage converter, storing the received driving power, and providing the stored driving power to the load.

When internal power is generated in a specific energy converter among the plurality of energy converters according to strength of the ambient energy sources, the generated internal power is selectively used as external power for another energy converter.

The multiple ambient energy sources may include at least two ambient energy sources selected from the group consisting of sunlight, vibration, heat, and wind.

Each of the plurality of energy converters may include a core connected to each of the multiple ambient energy sources, receiving energy from the multiple ambient energy sources, and converting the received energy into electrical energy; and a controller controlling an operation of the core, and when internal power is generated according to strength of the ambient energy sources, selectively using the generated internal power as external power of another energy converter.

Each of the plurality of energy converters may include an internal power node, when internal power is generated according to strength of the ambient energy sources, selectively supplying the generated internal power as external power of another energy converter; and an external power node selectively receiving internal power generated in another energy converter from an internal power node of the another energy converter.

The energy converter receiving internal power from an internal power node of another energy converter may maintain a standby state for operation.

In addition, the described technology provides an energy converter of an energy harvesting system using multiple ambient energy sources, the energy converter including a core connected to each of the multiple ambient energy sources, receiving energy from the multiple ambient energy sources, and converting the received energy into electrical energy; and a controller controlling an operation of the core, and when internal power is generated according to strength of the ambient energy sources, selectively using the generated internal power as external power of another energy converter.

The energy harvesting system according to the described technology can collect more energy from multiple ambient energy sources rather than from only one energy source, thereby operating an electronic device based on the collected energy.

The energy harvesting system according to the described technology can combine small amounts of electric energy collected from the respective ambient energy sources and convert the combined energy to have a usable electric energy level.

The energy harvesting system according to the described technology can collect more ambient energy in the same environment, so that it is possible to expand the types of electronic devices that can be operated using the energy harvesting technology. Accordingly, the energy harvesting system according to the described technology can be utilized for the development of sensors and devices that can be operated using ambient energy sources without a battery.

When internal power is generated in a specific energy converter according to the strength of the ambient energy source, the energy harvesting system according to the described technology can selectively use the generated internal power as external power of another energy converter. Accordingly, using a small amount of electrical energy collected by each energy converter, the energy collection efficiency can be improved.

DETAILED DESCRIPTION

Representative energy sources for energy harvesting include sunlight, vibration, heat, and wind, and devices that operate using such an individual energy source exist. However, the existing energy harvesting technology uses only one energy source in a limited environment, so that there is a problem in that it is difficult to utilize if the amount of corresponding energy is insufficient.

In the following description, only parts necessary to understand embodiments of the described technology will be described, and other parts will not be described to avoid obscuring the subject matter of the described technology.

Terms used herein should not be construed as being limited to their usual or dictionary meanings. In view of the fact that the inventor can appropriately define the meanings of terms in order to describe his/her own invention in the best way, the terms should be interpreted as meanings consistent with the technical idea of the described technology. In addition, the following description and corresponding drawings merely relate to specific embodiments of the described technology and do not represent all the subject matter of the described technology. Therefore, it will be understood that there are various equivalents and modifications of the disclosed embodiments at the time of the present application.

Now, embodiments of the described technology will be described in detail with reference to the accompanying drawings.

Figure 1:
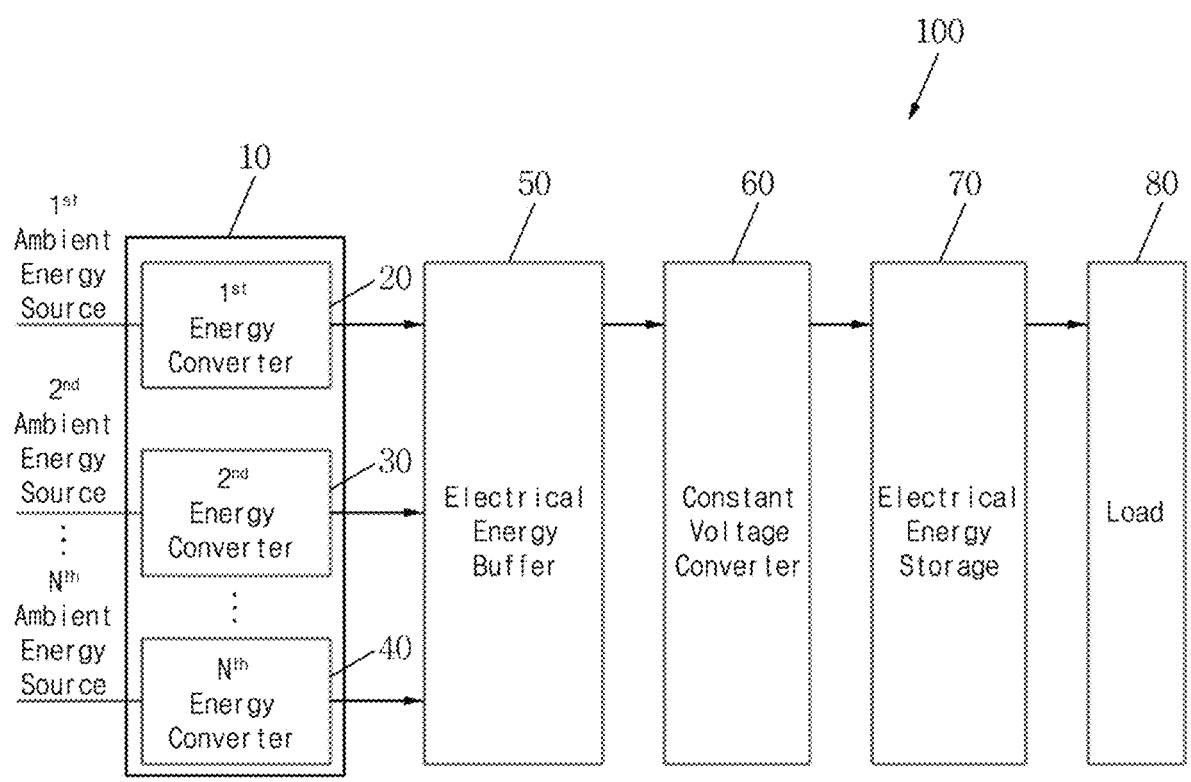
FIG. 1 is a block diagram illustrating an energy harvesting system using two or more types of energy according to an embodiment of the described technology.

FIG. 1 is a block diagram illustrating an energy harvesting system using two or more types of energy according to an embodiment of the described technology.

Referring to FIG. 1, the energy harvesting system 100 according to this embodiment is a system that collects more energy from multiple ambient energy sources rather than collects energy from only one ambient energy source, and operates a load 80 (e.g., an electronic device) based on the collected energy.

The energy harvesting system 100 according to this embodiment includes a plurality of energy converters 10, an electrical energy buffer 50, a constant voltage converter 60, and an electrical energy storage 70. The plurality of energy converters 10 are connected to multiple ambient energy sources, respectively, receive energy from the multiple ambient energy sources, and convert the received energy into electrical energy. The electrical energy buffer 50 receives and collects electrical energy from the plurality of energy converters 10, and combines the collected electrical energy to have a predetermined power level. The constant voltage converter 60 receives the combined electrical energy from the electrical energy buffer 50, and converts the received electrical energy into driving power of a power level usable by the load 80. The electrical energy storage 70 receives the driving power from the constant voltage converter 60, stores the received driving power, and provides the stored driving power to the load 80. In this case, when internal power is generated in a specific energy converter among the plurality of energy converters 10 according to the strength of the ambient energy source, the generated internal power may be selectively used as external power for another energy converter.

The multiple ambient energy sources include first to nth ambient energy sources (hereinafter, 'n' is a natural number of 2 or more). The ambient energy sources may be sunlight, vibration, heat, and wind, but are not limited thereto. The multiple ambient energy sources include two or more different types of ambient energy sources.

The plurality of energy converters 10 are connected one-to-one to the multiple ambient energy sources, and each energy converter receives energy from each ambient energy source and converts it into electrical energy. The plurality of energy converters 10 includes first to nth energy converters 20, 30, and 40. Each of the plurality of energy converters 10 generates internal power by using the ambient energy source.

The electrical energy buffer 50 temporarily stores electrical energy collected from the plurality of energy converters 10, and includes a passive element such as a capacitor capable of storing electrical energy. The electrical energy buffer 50 combines the electrical energy collected from the plurality of energy converters 10, converts the combined electrical energy to have a predetermined power level, and delivers the converted electrical energy to the constant voltage converter 60.

The constant voltage converter 60 receives the stored electrical energy from the electrical energy buffer 50, and converts the received electrical energy into driving power of a power level usable by the load 80.

The electrical energy storage 70 is an energy storage device that stores driving power for operating the load 80, and may use, for example, a capacitor, a secondary battery, or the like. The electrical energy storage 70 provides the stored driving power to the load 80.

Hereinafter, the operation principle of the energy harvesting system 100 according to this embodiment will be described.

First, the energy converters 10 receives energy from one or more ambient energy sources and converts it into electrical energy.

Next, the electrical energy obtained by the energy converters 10 is accumulated in the electrical energy buffer 50. Because the type and intensity of the ambient energy sources are varied depending on the surrounding environment, the amount of electrical energy obtained by the respective energy converters 10 and accumulated in the electrical energy buffer 50 is also different. Therefore, the electrical energy buffer 50 adds up the accumulated electric energy.

In general, the load 80 such as an electronic device has a determined operable power level (voltage and current level), so that the electrical energy accumulated in the electrical energy buffer 50 cannot be used for the load 80 as it is.

Therefore, the electrical energy accumulated in the electrical energy buffer 20 is transferred to the constant voltage converter 60 to be converted into the driving power that can be used by the load 80, that is, a constant voltage/current. The constant voltage converter 60 transfers the driving power to the electrical energy storage 70.

The electrical energy storage 70 stores the driving power received from the constant voltage converter 60 and provides required driving power to the load 80 from among the stored driving power.

As described above, when internal power is generated in a specific energy converter among the plurality of energy converters 10 according to the strength of the ambient energy source, the generated internal power may be selectively used as external power for another energy converter. Accordingly, using a small amount of electrical energy collected by each of the first to nth energy converters 20, 30, and 40, the energy collection efficiency can be improved.

Figure 2:
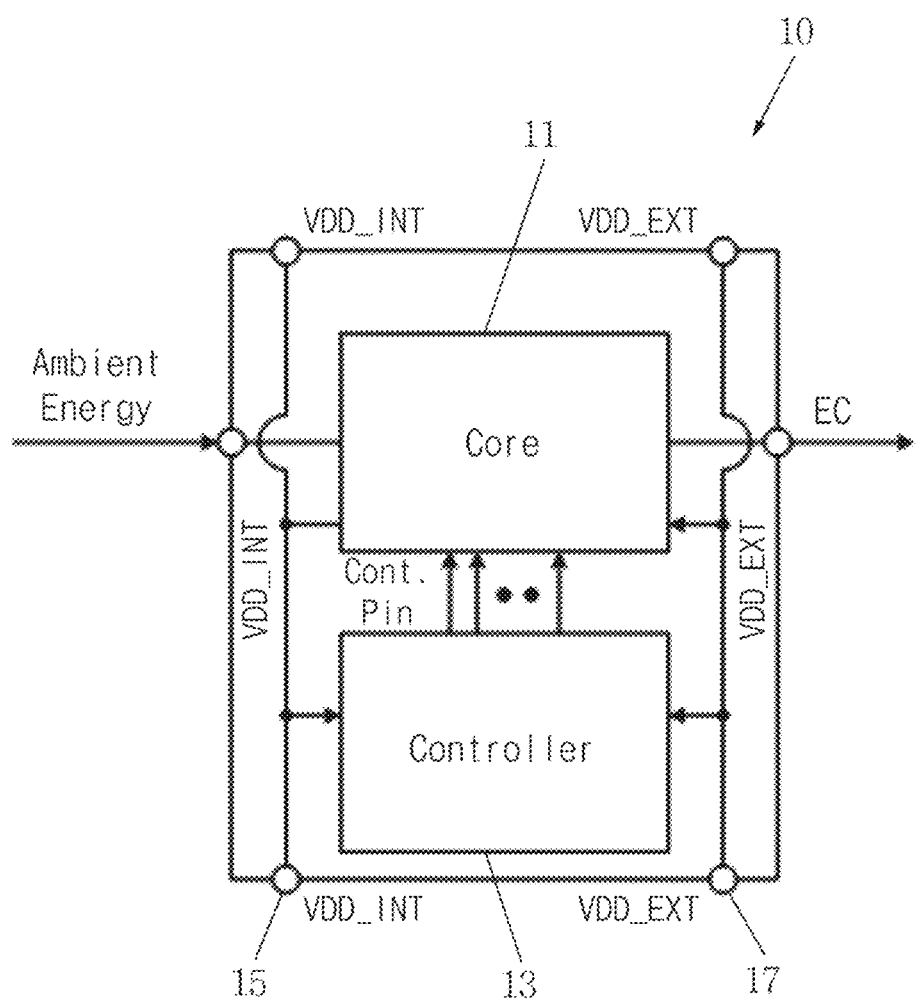
FIG. 2 is a block diagram illustrating the energy converter of FIG. 1.
Figure 3:
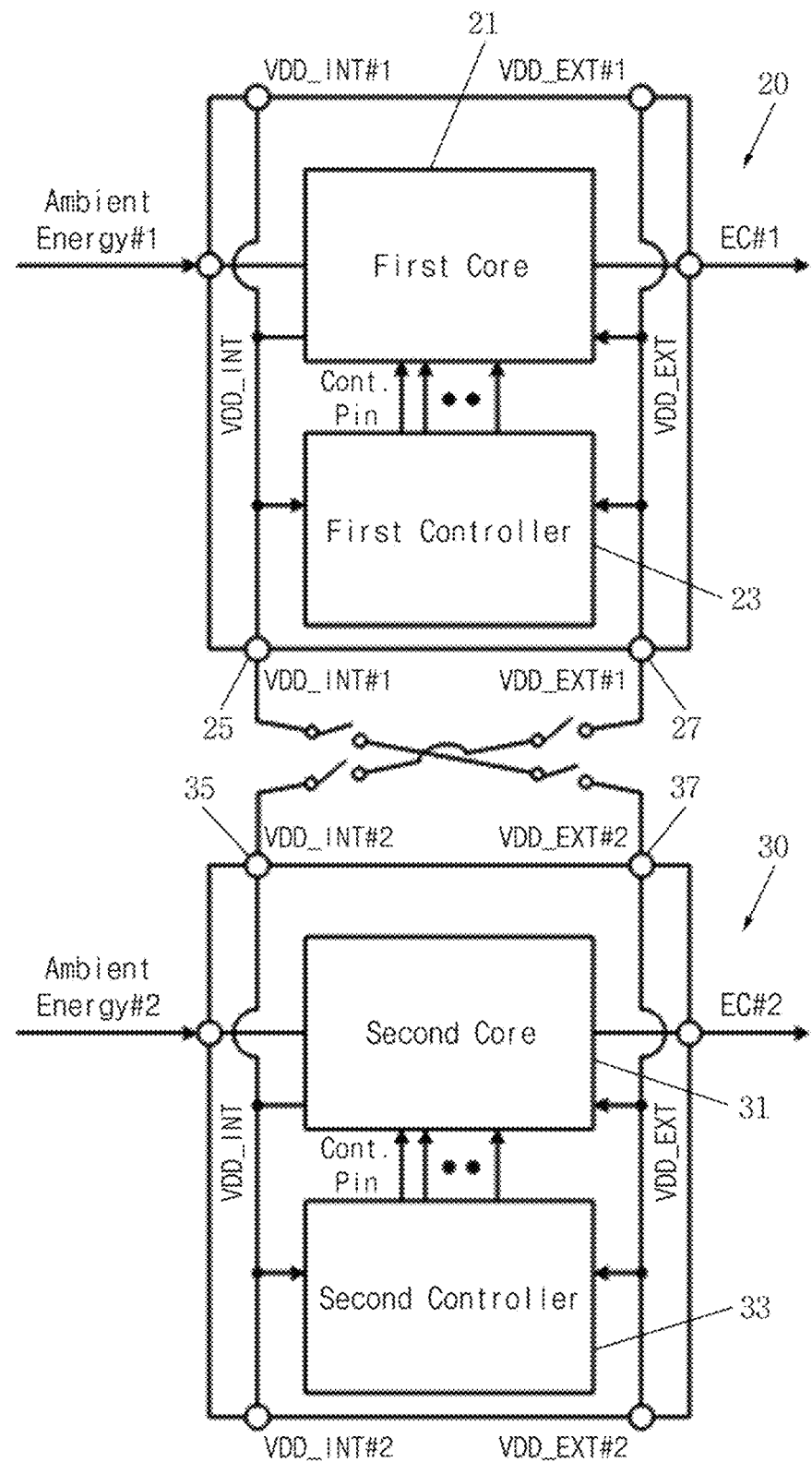
FIG. 3 is a block diagram illustrating a connection structure of two energy converters of FIG. 1.

Now, the energy converter 10 of the energy harvesting system 100 according to this embodiment will be described with reference to FIGS. 1 to 3. FIG. 2 is a block diagram illustrating the energy converter 10 of FIG. 1, and FIG. 3 is a block diagram illustrating a connection structure of two energy converters 20 and 30 of FIG. 1.

Referring to FIG. 2, the energy converter 10 according to this embodiment includes a core 11 and a controller 13. The core 11 is connected to each of multiple ambient energy sources, receives energy from the multiple ambient energy sources, and converts the received energy into electrical energy. The controller 13 controls the operation of the core 13.

In order for the energy converter 10 to operate, operating power should be applied to the core 11 and the controller 13. In one method, the energy converter 10 generates internal power (VDD_INT) by itself using an ambient energy source and uses the generated internal power as operating power. In another method, the energy converter 10 uses separate external power (VDD_EXT) as operating power.

In case of using internal power as the operating power, there is an advantage that the use of separate external power is not required. However, until the operating power for operating the energy converter is generated at the initial operation, it is impossible to collect and convert energy. Therefore, there is a disadvantage that very little energy cannot be collected.

On the other hand, in case of using external power as the operating power, the operating voltage is already supplied to the core 11 and the controller 13, and thus the energy converter maintains a standby state. Therefore, it is possible to collect relatively small energy compared to the method using internal power, and it is also possible to improve the efficiency of converting input energy into electrical energy in the energy converter. However, because of having to separately use external power, there is a disadvantage that it cannot be used in an environment where there is no battery or external power connection is impossible, and there is also a disadvantage that it is impossible to implement an energy harvesting system that operates using only the ambient energy source.

Provided in this embodiment is the energy converter 10 in which the advantages of using internal power and using external power are combined. That is, when the internal power (VDD_INT) is generated according to the strength of the ambient energy source, the controller 11 of the energy converter 10 selectively uses the generated internal power as the external power (VDD_EXT) of another energy converter.

The energy converter 10 according to this embodiment may include an internal power node 15 and an external power node 17. When the internal power (VDD_INT) is generated according to the strength of the ambient energy source, the internal power node 15 may selectively supply the generated internal power (VDD_INT) as the external power (VDD_EXT) of another energy converter. The external power node 17 selectively receives the internal power (VDD_INT) from the internal power node of another energy converter.

That is, when the internal power (VDD_INT) is generated in a specific energy converter according to the strength of the ambient energy source, the internal power node of the specific energy converter where the internal power (VDD_INT) is generated is selectively connected to the external power node of another energy converter to supply external operating power (VDD_EXT).

The energy converter that receives the internal power (VDD_INT) from the internal power node of another energy converter can maintain a standby state for operation, so that it can collect even very small energy and thus improve the efficiency of converting input energy into electrical energy in the energy converter.

Referring to FIG. 3, the first and second energy converters 20 and 30 include first and second cores 21 and 31 and first and second controllers 23 and 33.

In addition, internal power nodes 25 and 35 and external power nodes 27 and 37 of the first and second energy converters 20 and 30 are cross connected to each other. That is, the internal power node 25 of the first energy converter 20 is selectively connected to the external power node 37 of the second energy converter 30. The external power node 27 of the first energy converter 20 is selectively connected to the internal power node 35 of the second energy converter 30.

Therefore, when internal power is generated in the first energy converter 20, the internal power node 25 of the first energy converter 20 is selectively connected to the external power node 37 of the second energy converter 30 and provides the internal power (VDD_INT) generated in the first energy converter 20 to the second energy converter 30.

On the contrary, when internal power is generated in the second energy converter 30, the internal power node 35 of the second energy converter 30 is selectively connected to the external power node 27 of the first energy converter 20 and provides the internal power (VDD_INT) generated in the energy converter 30 to the first energy converter 20.

Although FIG. 3 illustrates that the internal power nodes 25 and 35 and the external power nodes 27 and 37 of the first and second energy converters 20 and 30 are cross connected to each other, this is exemplary only and is not construed as a limitation. Depending on the number of energy sources for collection, it can be expanded to n energy converters. In addition, depending on the ambient energy source situation, it is possible to selectively use the internal power of one energy converter generating the internal power among n energy converters as the external power of the other n–1 energy converters.

As described above, the energy converter 10 according to this embodiment can improve energy collection efficiency when collecting energy from multiple ambient energy sources without any separate connection of a battery or other external power source. That is, in the energy harvesting system 100 according to this embodiment, when the internal power (VDD_INT) is generated in the specific energy converter 10 according to the strength of the ambient energy source, the generated internal power (VDD_INT) can be selectively used as the external power (VDD_EXT) of another energy converter 10. Accordingly, using a small amount of electrical energy collected by each energy converter 10, the energy collection efficiency can be improved.

The energy harvesting system 100 according to this embodiment can collect more energy from multiple ambient energy sources rather than from only one energy source, thereby operating an electronic device based on the collected energy.

The energy harvesting system 100 according to this embodiment can combine small amounts of electric energy collected from the respective ambient energy sources and convert the combined energy to have a usable electric energy level.

The energy harvesting system 100 according to this embodiment can collect more ambient energy in the same environment, so that it is possible to expand the types of electronic devices that can be operated using the energy harvesting technology. Accordingly, the energy harvesting system 100 according to this embodiment can be utilized for the development of sensors and devices that can be operated using ambient energy sources without a battery.

While the described technology has been particularly shown and described with reference to an exemplary embodiment thereof, it will be understood by those skilled in the art that various changes in form and details may be made therein without departing from the scope of the described technology as defined by the appended claims.

What is claimed is:

1. An energy harvesting system using multiple ambient energy sources, the energy harvesting system comprising:
   a plurality of energy converters respectively connected to the multiple ambient energy sources and configured to receive energy from the multiple ambient energy sources, and convert the received energy into electrical energy, the plurality of energy converters comprising a first energy converter and a second energy converter electrically connected to and different from each other;
   an electrical energy buffer configured to receive and collect the electrical energy from the plurality of energy converters, and combine the collected electrical energy to have a predetermined power level;
   a constant voltage converter configured to receive the combined electrical energy from the electrical energy buffer, and convert the received electrical energy into driving power of a power level usable by a load; and
   an electrical energy storage configured to receive the driving power from the constant voltage converter, store the received driving power, and provide the stored driving power to the load,
   wherein the first energy converter is configured to:
      generate internal power according to strength of the ambient energy sources, and
      selectively provide the internal power as external power for the second energy converter.

2. The energy harvesting system of claim 1, wherein the multiple ambient energy sources include at least two ambient energy sources selected from the group consisting of sunlight, vibration, heat, and wind.

3. The energy harvesting system of claim 1, wherein each of the plurality of energy converters includes:
   a core connected to each of the multiple ambient energy sources and configured to receive energy from the multiple ambient energy sources, and convert the received energy into electrical energy; and
   a controller configured to:
      control an operation of the core,
      generate internal power according to strength of the ambient energy sources, and
      selectively use the generated internal power as external power of another different energy converter of the plurality of energy converters.

4. The energy harvesting system of claim 1, wherein each of the plurality of energy converters includes an internal power node and an external power node:
   wherein the internal power node of the first energy converter is configured to generate the internal power and selectively supply the generated internal power as external power of the second energy converter; and
   wherein the external power node of the first energy converter is configured to selectively receive internal power generated in a third energy converter from an internal power node of the third energy converter.

5. The energy harvesting system of claim 1, wherein the second energy converter is configured to maintain a standby state for operation.

6. An energy converter of an energy harvesting system using multiple ambient energy sources, the energy converter comprising:
   a core connected to each of the multiple ambient energy sources and configured to receive energy from the multiple ambient energy sources, and convert the received energy into electrical energy; and
   a controller configured to control an operation of the core, and generate internal power according to strength of the ambient energy sources, selectively use the generated internal power as external power of another different energy converter.

7. The energy converter of claim 6, further comprising:
   an internal power node configured to generate the internal power and selectively supply the generated internal power as external power of a first another energy converter; and
   an external power node configured to selectively receive internal power generated in an internal power node of the first another energy converter or a second another energy converter.

8. The energy converter of claim 7, wherein the controller is configured to maintain a standby state for operation.

9. The energy harvesting system of claim 1, wherein each of the first and second energy converters includes an internal power node and an external power node, and wherein the internal power node of the first energy converter is selectively connected to the external power node of the second energy converter, and wherein the external power node of the first energy converter is selectively connected to the internal power node of the second energy converter.

* * * * *